US006975842B2

(12) United States Patent
Chen

(10) Patent No.: US 6,975,842 B2
(45) Date of Patent: Dec. 13, 2005

(54) MOBILE PHONE WITH BATTERY LATCH

(75) Inventor: Ming-Te Chen, Sanchung (TW)

(73) Assignee: BENQ Corporation, Taoyuan (TW)

( * ) Notice: Subject to any disclaimer, the term of this patent is extended or adjusted under 35 U.S.C. 154(b) by 518 days.

(21) Appl. No.: 10/206,522

(22) Filed: Jul. 25, 2002

(65) Prior Publication Data
US 2003/0022633 A1 Jan. 30, 2003

(30) Foreign Application Priority Data
Jul. 26, 2001 (TW) ................................. 90118355

(51) Int. Cl.$^7$ ............................................... H04B 1/38
(52) U.S. Cl. ................. 455/90.3; 455/575.1; 455/347; 379/433.11; 429/96
(58) Field of Search ............................... 455/90, 575.1, 455/575, 550, 347–349, 90.3, 573, 550.1, 455/344; 379/433.11, 433.12; 429/96, 100, 429/163, 176

(56) References Cited

U.S. PATENT DOCUMENTS

| | | | | |
|---|---|---|---|---|
| 5,671,274 A | * | 9/1997 | Kotaka .................. | 379/433.12 |
| 5,825,896 A | * | 10/1998 | Leedom ...................... | 381/322 |
| 6,060,193 A | * | 5/2000 | Remes et al. .................. | 429/96 |
| 6,625,425 B1 | * | 9/2003 | Hughes et al. ............. | 455/90.3 |
| 2001/0009847 A1 | * | 7/2001 | Kim et al. ..................... | 455/90 |

* cited by examiner

Primary Examiner—Lee Nguyen
(74) Attorney, Agent, or Firm—Snell & Wilmer L.L.P.

(57) ABSTRACT

A mobile phone has a housing having a battery chamber for selectively accommodating a rechargeable battery. The mobile phone includes a battery latch and a latch coupling element. The battery latch is movably connected with the housing for locking or releasing the rechargeable battery. The latch coupling element is disposed on the housing adjacent to the battery chamber. The battery latch, corresponding to the latch coupling element, reciprocally moves along a direction parallel to a longitudinal axis of the battery chamber. When no force is exerted on the battery latch, the battery latch is in a first position. When a predetermined force is exerted on the battery latch, the battery latch moves a predetermined distance to a second position to release the battery from the housing.

15 Claims, 6 Drawing Sheets

MOBILE PHONE WITH BATTERY LATCH

This application claims priority of Taiwan Patent Application Serial No. 90118355 filed on Jul. 26, 2001.

FIELD OF INVENTION

The present invention relates to mobile phones, and more particularly, to mobile phone with a battery latch to lock or release a rechargeable battery.

BACKGROUND OF THE INVENTION

Recently mobile phones have become one of the most widely used and convenient communication equipment. Typically, such phones employ rechargeable batteries, such as NiMH batteries, Li-ion batteries, or Li-polymer batteries, as power supplies. When a battery runs out of electricity, the rechargeable battery is often removed from the housing of the mobile phone so that the battery can be recharged or replaced. A connection mechanism, therefore, is required for connecting the rechargeable battery to the housing of the mobile phone and for releasing the rechargeable battery from the mobile phone at appropriate times.

As the technology evolves, the rechargeable battery not only becomes increasingly thin, but also the mobile phone becomes provided with enhanced functionality. At the same time, the demand for mobile phones of smaller size and increasingly attractive appearance rapidly increases.

Typical prior art mobile phones frequently employ a battery latch as the connection mechanism. The battery latch is usually disposed at one end of the shell of the rechargeable battery such that the rechargeable battery is directly connected to the housing of the mobile phone. Referring to FIG. 1, a schematic diagram of a prior art mobile phone 100 is shown. A battery latch 102 is disposed at one end of the rechargeable battery 101 to connect the rechargeable battery 101 to the housing 103 of the mobile phone 100. Typically, a space is necessarily reserved for a user to gain access to the battery latch 102 during operation. A recess 104 is therefore formed on the housing 103 of the mobile phone 100.

In prior art mobile phone 100 shown in FIG. 1, the battery latch 102 is not integral with the housing 103 of the mobile phone 100, thus degrading the appearance of the phone. Moreover, when the mobile phone 100 employing battery latch 102 to connect the rechargeable battery 101 to housing 103 falls to the ground rechargeable battery 101 may become detached easily from housing 103 resulting in damage to the housing 103 and/or the rechargeable battery 101.

It is therefore a desire to develop a mobile phone having a connection mechanism that is integral with the appearance of the housing and that is convenient for the user to mount or remove the rechargeable battery.

SUMMARY OF THE INVENTION

To overcome the drawbacks described above various embodiments of the present invention provide a mobile phone with a battery latch that prevents the detachment of the rechargeable battery when accidental external force impacts on the mobile phone.

In one aspect of the present invention, a mobile phone is provided with a rechargeable battery having a simple disassembly mechanism. The mobile phone has a housing having a battery chamber for selectively accommodating a rechargeable battery. The mobile phone includes a battery latch and a latch coupling element that is movably connected with the housing. The battery latch includes a pair of guide rails on its bottom and a bulge at its front fringe. The latch coupling element may be disposed on the housing adjacent to the battery chamber. The latch coupling element includes a pair of guide grooves for sliding movement of the pair of guide rails and an elastic member elastically contacting the bulge so that the battery latch reciprocally moves corresponding to the latch coupling element to lock or release the rechargeable battery.

When no force is exerted on the battery latch, the battery latch is suitably in a first position. When a predetermined force is exerted on the battery latch, the battery latch moves a predetermined distance to a second position. When the battery latch is in the first position, the bulge of the battery latch is engaged within a cavity in the bottom of the rechargeable battery to lock the battery into position. When the battery latch moves from the first position to the second position, the bulge leaves the cavity to release or reinstall the battery. When the battery latch is in the second position and the predetermined force is removed, the elastic force of the elastic member suitably returns the battery latch to the first position.

In a further embodiment, the battery latch includes a pair of positioning hooks and the latch coupling element further includes a pair of positioning slots for accommodating the pair of positioning hooks. When no force is exerted on the battery latch, the elastic force of the elastic member makes each of the positioning hooks contact a front edge of each of the positioning slots to maintain the battery latch in the first position. When the predetermined force is exerted and the battery latch moves the predetermined distance, each of the positioning hooks contacts to a rear edge of each of the positioning slots to maintain the battery latch in the second position.

In an alternative embodiment, the latch coupling element further includes a guide pillar for connecting the elastic member. When the predetermined force is exerted and the battery latch moves the predetermined distance, a bottom of the bulge contacts the guide pillar to maintain the battery latch in the second position.

In another embodiment of the present invention, the battery chamber includes a metal leaf spring flexibly contacting the rechargeable battery. When the battery latch is in the first position, the metal leaf spring serves as an electrical contact between the rechargeable battery and the mobile phone. When the battery latch moves from the first position to the second position, the rechargeable battery is bounced off the battery chamber due to the metal leaf spring.

In another aspect, a mobile phone is provided with a battery latch that is integral with the housing of the mobile phone. When the battery latch is in the first position, the battery latch substantially covers the latch coupling element.

BRIEF DESCRIPTION OF THE DRAWINGS

The foregoing aspects and many of the attendant advantages of this invention will become more readily understood by reference to the following detailed description, when taken in conjunction with the accompanying drawings, wherein.

DETAILED DESCRIPTION OF EXEMPLARY EMBODIMENTS

Figure 1:
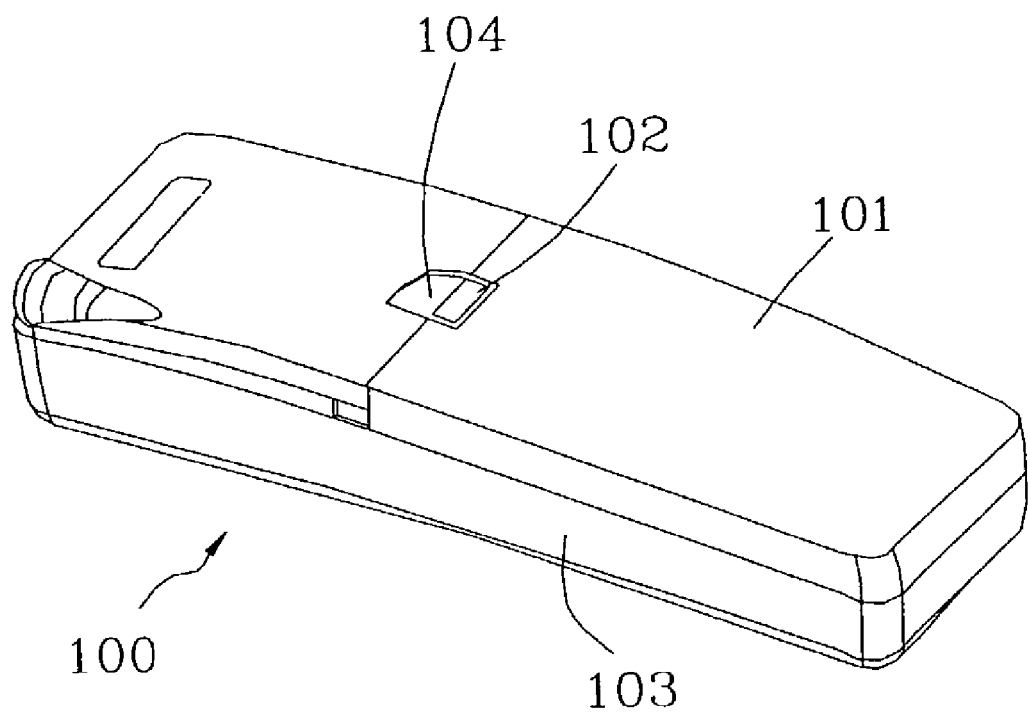
FIG. 1 is a schematic diagram of a mobile phone according to the prior art.
Figure 2:
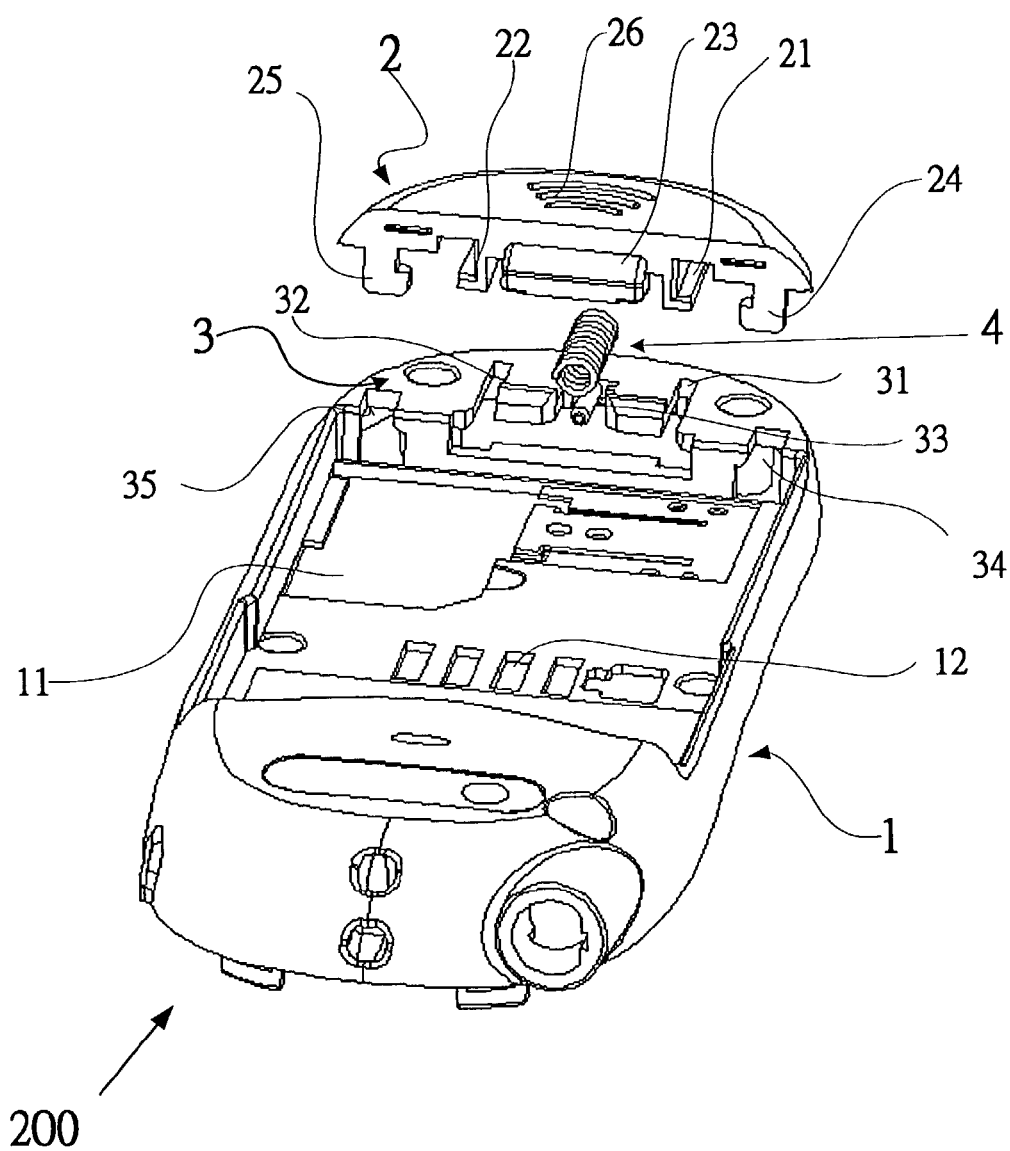
FIG. 2 is a perspective view of an exemplary mobile phone.
Figure 4A:
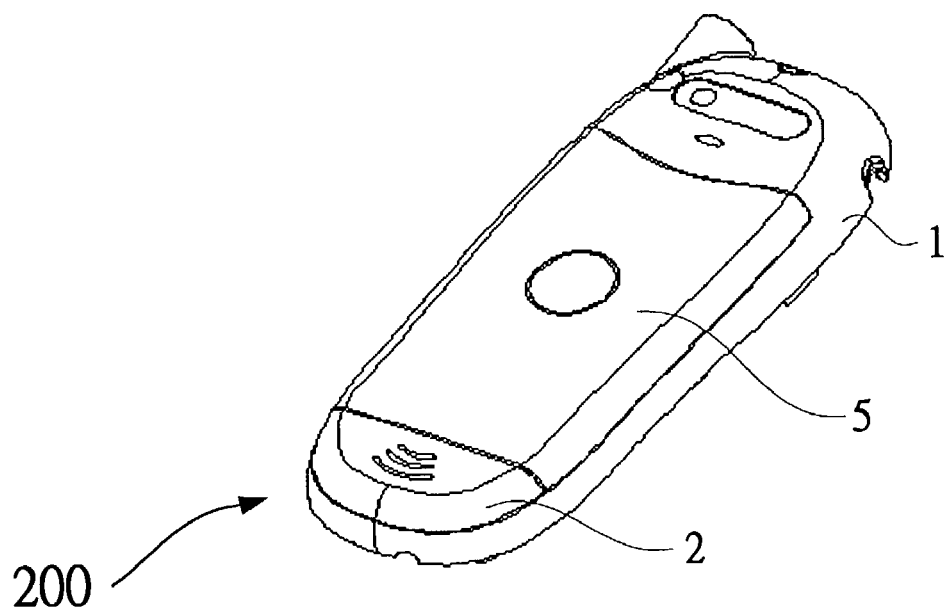
FIG. 4a is a schematic diagram of an exemplary mobile phone when the battery latch is in the first position.
Figure 5A:
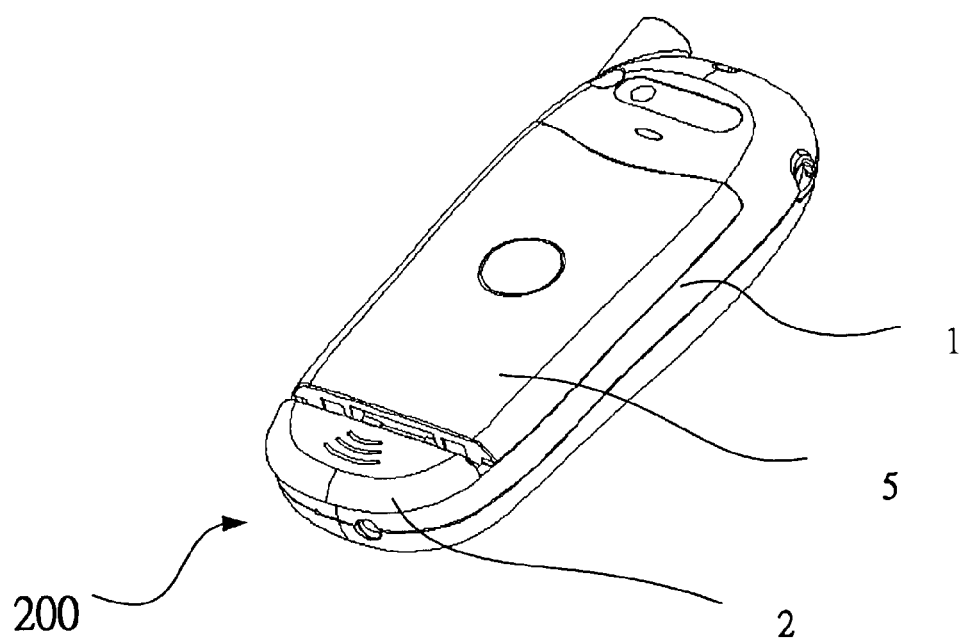
FIG. 5a is a schematic diagram of the exemplary mobile phone when the battery latch is in the second position.

Referring to FIG. 2, an exemplary mobile phone 200 suitably includes a housing 1 having a battery chamber 11 sized to selectively accommodate a rechargeable battery 5 (as shown in FIG. 4a and FIG. 5a). The mobile phone 200 includes a battery latch 2 used for locking or releasing the rechargeable battery 5. The battery latch 2 may be movably connected with housing 1 as shown. Mobile phone 200 further includes a latch coupling element 3, which is disposed on the housing 1 adjacent to battery chamber 11.

Figure 3A:
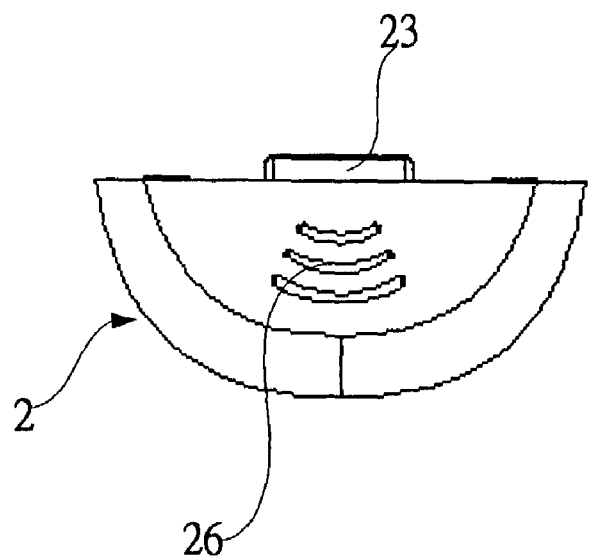
FIG. 3a is a top view of an exemplary battery latch of a mobile phone.
Figure 3B:
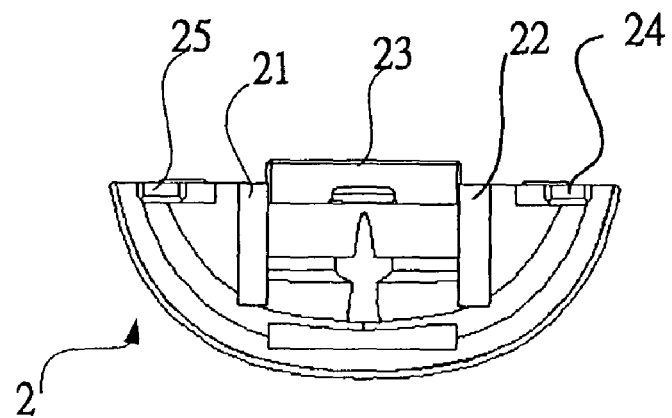
FIG. 3b is a bottom view of the exemplary battery latch of the mobile phone.

As shown in FIG. 2, FIG. 3a, and FIG. 3b, battery latch 2 has a pair of guide rails 21, 22 and a pair of positioning hooks 24, 25 on its bottom surface. Battery latch 2 further includes a rough surface 26 such as any number of elevated lines or grooves to increase friction when a user exerts a predetermined force on battery latch 2. Battery latch 2 further includes a bulge 23 which may be disposed on a front fringe of the battery latch 2 as approved.

As shown in FIG. 2, latch coupling element 3 suitably has a pair of guide grooves 31, 32, a guide pillar 33, a pair of positioning slots 34, 35, and an elastic member 4, which may be a spring or other biasing device. The pair of the guide rails 21, 22 of battery latch 2 slide in the pair of the guide grooves 31, 32, respectively. The pair of the positioning slots 34, 35 accommodate the pair of positioning hooks 24, 25 of battery latch 2. Guide pillar 33 suitably connects to spring 4, which flexibly contacts a bottom of bulge 23 of battery latch 2. Battery latch 2 reciprocally moves corresponding to the latch coupling element 3 along a direction parallel to a longitudinal axis of the guide pillar 33 (or a longitudinal axis of the battery chamber 11) to lock or release the rechargeable battery 5.

Figure 4B:
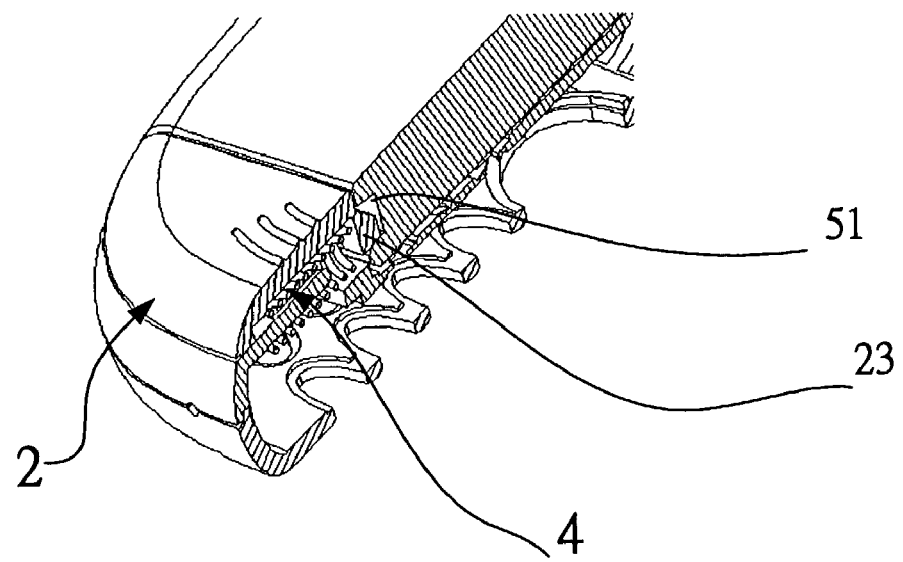
FIG. 4b is a cross-sectional view of the exemplary battery latch of the mobile phone when the battery latch is in the first position.
Figure 5B:
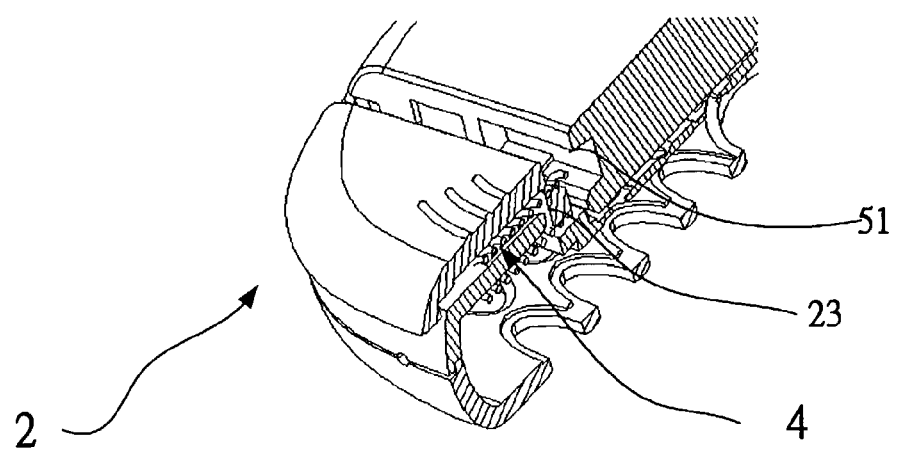
FIG. 5b is a cross-sectional view of the exemplary battery latch of the mobile phone when the battery latch is in the second position.
Figure 6:
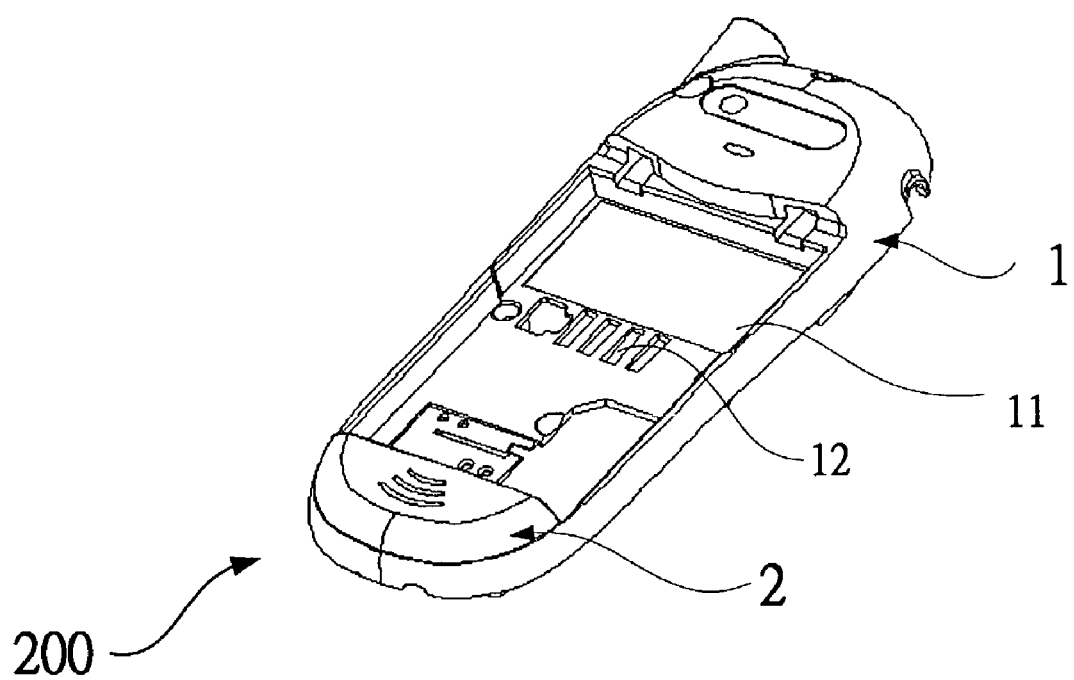
FIG. 6 is a schematic diagram of the exemplary mobile phone without installing a rechargeable battery.

Referring now to FIGS. 4a and 4b, when no force is exerted on battery latch 2, the elastic force of spring 4 makes each of the positioning hooks 24, 25 contact a front edge of each of the positioning slots 34, 35 to maintain battery latch 2 in the first position. Referring to FIGS. 5a and 5b, when the predetermined force is exerted on battery latch 2 and battery latch 2 moves the predetermined distance, each of the positioning hooks 24, 25 contacts a rear edge of each of the positioning slots 34, 35. The bottom of bulge 23 contacts the front edge of guide pillar 33 when the battery is in the second position.

As shown in FIG. 4a, battery latch 2 is integral with the housing 1 of the mobile phone 200. When battery latch 2 is in the first position, battery latch 2 fully covers the latch coupling element 3, and is integrated with the housing 1 of the mobile phone 200 and rechargeable battery 5.

As shown in FIG. 4a and FIG. 4b, when battery latch 2 is in the first position, the front fringe of the battery latch 2 contacts the bottom of rechargeable battery 5. Due to the elastic force of spring 4, bulge 23 of battery latch 2 is engaged with cavity 51 in the bottom of rechargeable battery 5 to lock rechargeable battery 5.

When battery latch 2 moves from the first position to the second position, as shown in FIG. 5a and FIG. 5b, bulge 23 of battery latch 2 leaves cavity 51 of the rechargeable battery 5 to release or reinstall the rechargeable battery 5. When battery latch 2 is in the second position and the predetermined force is removed, the elastic force of spring 4 makes battery latch 2 revert to the first position, as shown in FIG. 4a and FIG. 4b.

Referring again to FIG. 2, FIG. 4a, FIG. 5a, and FIG. 6, battery chamber 11 suitably includes a metal leaf spring 12 flexibly contacting the rechargeable battery 5. When battery latch 2 is in the first position, metal leaf spring 12 serves as an electrical contact between rechargeable battery 5 and mobile phone 200. When battery latch 2 moves from the first position to the second position, rechargeable battery 5 is bounced off battery chamber 11 due to metal leaf spring 12.

Although specific embodiments have been illustrated and described, various modifications may be made without departing from the invention, which is intended to be limited solely by the appended claims and their legal equivalents.

What is claimed is:

1. A mobile phone having a housing, the housing having a battery chamber configured to selectively accommodate a rechargeable battery, the mobile phone comprising:
   a battery latch, movably connected with the housing, configured to lock the rechargeable battery in a first position and to release the rechargeable battery in a second position; and
   a latch coupling element disposed on the housing and located adjacent to the battery chamber, the battery latch, corresponding to the latch coupling element, reciprocally moving along a direction parallel to a longitudinal axis of the battery chamber;
   wherein the battery latch is in the first position when no force is exerted on the battery latch, and the battery latch is in the second position for placing the rechargeable battery when a predetermined force is exerted on the battery latch to move the battery latch to a predetermined distance.

2. The mobile phone of claim 1, wherein the battery latch is integral with the housing, and wherein the battery latch substantially covers the latch coupling element when the battery latch is in the first position.

3. The mobile phone of claim 1, wherein the battery latch has a rough top surface to increase friction when the predetermined force is exerted on the battery latch.

4. The mobile phone of claim 1, wherein the battery chamber comprises a spring flexibly contacting the rechargeable battery wherein the spring is positioned to electrically couple the rechargeable battery and the mobile phone when the battery latch is in the first position, and to bias the rechargeable battery away from the battery chamber due to the metal leaf spring when the battery latch moves from the first position to the second position.

5. The mobile phone of claim 4, wherein the spring is a metal leaf spring.

6. The mobile phone of claim 1, wherein the battery latch has a bottom surface and a front fringe, the battery latch further comprising a pair of guide rails on the bottom surface and a bulge on the front fringe.

7. The mobile phone of claim 6, wherein the latch coupling element comprises:
 a pair of guide grooves configured for sliding movement of the pair of guide rails; and
 an elastic member elastically contacting the bulge, wherein the battery latch reciprocally moves corresponding to the latch coupling element to selectively lock and release the rechargeable battery.

8. The mobile phone of claim 7, wherein the bulge is engaged with a cavity in bottom of the rechargeable battery to lock the rechargeable battery when the battery latch is in the first position.

9. The mobile phone of claim 8, wherein the bulge leaves the cavity to release or reinstall the rechargeable battery, when the battery latch moves from the first position to the second position.

10. The mobile phone of claim 9, wherein, the elastic force of the elastic member bias battery latch to the first position when the battery latch is in the second position and the predetermined force is removed.

11. The mobile phone of claim 10, wherein the battery latch further comprises a pair of positioning hooks, and the latch coupling element further comprises a pair of positioning slots configured to accommodate the pair of positioning hooks.

12. The mobile phone of claim 11, wherein the elastic member biases each of the positioning hooks to contact a front edge of each of the positioning slots to maintain the battery latch in the first position when no force is exerted on the battery latch, and to contact a rear edge of each of the positioning slots to maintain the battery latch in the second position, when the predetermined force is exerted upon the battery latch.

13. The mobile phone of claim 12, wherein the latch coupling element further comprises a guide pillar configured to connect the elastic member.

14. The mobile phone of claim 13, wherein a bottom of the bulge contacts the guide pillar to maintain the battery latch in the second position when the predetermined force is exerted upon the battery latch.

15. The mobile phone of claim 7, wherein the elastic member is a spring.

\* \* \* \* \*